Patented Aug. 26, 1947

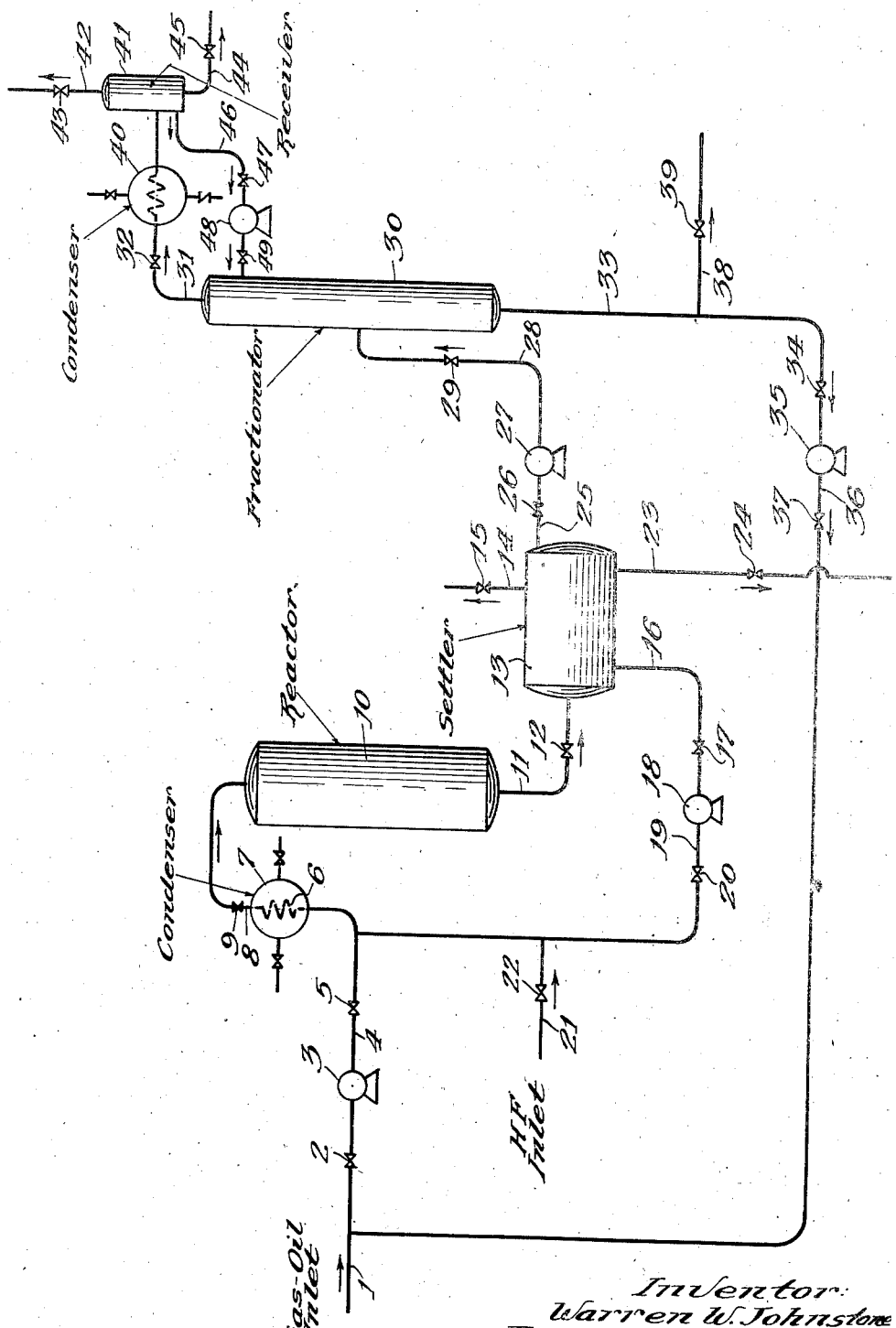

2,426,273

UNITED STATES PATENT OFFICE 2,426,273

CATALYTIC CRACKING OF HYDROCARBONS

Warren W. Johnstone, Riverside, Ill., assignor to Universal Oil Products Company, Chicago, Ill., a corporation of Delaware Application September 14, 1945, Serial No. 616,335

4 Claims. (Cl. 196—52)

The present invention relates to the catalytic cracking of hydrocarbons, and is more particularly concerned with improvements in catalytic cracking operations employing a catalyst comprising hydrogen fluoride.

It has been found that hydrogen fluoride is a comparatively active catalyst for the conversion of high-boiling hydrocarbons to valuable low-boiling hydrocarbons, such as gas oil to gasoline hydrocarbons.

Hydrogen fluoride as a cracking catalyst possesses various advantages over other cracking catalysts, these advantages being inherent in the physical properties of hydrogen fluoride. Since the hydrogen fluoride can be maintained in a liquid phase at moderately low temperatures and pressures, it is possible to operate the cracking reaction with the reactants and catalyst in a liquid phase. This feature permits the use of various types of equipment which make it possible to obtain very good contact between the catalyst and the reactants.

One of the basic disadvantages of the use of hydrogen fluoride as a cracking catalyst is the fact that while it does possess substantial cracking activity, its activity level is somewhat lower than that of more commonly known cracking catalysts, such as silica-alumina composites, either synthetic or natural. This lower activity level necessitates the use of a recycle operation to obtain a satisfactory conversion, since the conversion per pass is low. However, a recycle operation entails the use of additional pumping equipment, and increases the initial capital investment to an appreciable extent, thereby detracting from the commercial utility of the operation.

It is an object of the present invention to provide a promoting compound which will increase the activity of the hydrogen fluoride catalyst to an extent such that once-through conversions comparable to those obtained with other cracking catalysts such as silica-alumina are obtained, thus providing an operation in which the disadvantages of excessive recycles are elminated, while retaining the advantages inherent in the use of a liquid cracking catalyst.

In one embodiment, the present invention comprises a process for a catalytic conversion of high-boiling hydrocarbons to lower-boiling hydrocarbons, which comprises subjecting said high-boiling hydrocarbons to contact under conversion conditions with a catalyst comprising hydrogen-fluoride promoted by metallic aluminum.

The various features of the present invention will be more clearly pointed out in the following description of the attached sketch which illustrates in conventional side elevation one type of apparatus in which the objects of the present invention may be accomplished.

Referring to the drawing, a gas oil charge is introduced through line 1 containing valve 2 into pump 3 which discharges through line 4 containing valve 5, and after being commingled with hydrogen fluoride and aluminum, as hereinafter set forth, passes through coil 6, disposed within heat exchanger 7, wherein the mixture is raised to the desired temperature. The heated mixture of the reactants and catalyst leaves exchanger 7 through line 8, containing valve 9, and passes into reactor 10, wherein the gas oil charge is cracked in the presence of hydrogen fluoride and metallic aluminum to produce a high anti-knock gasoline.

Reactor 10 may comprise any type of equipment in which intimate contact between the catalyst and reactants may be obtained. For example, reactor 10 may comprise a Stratford contactor, turbomixer, or a time tank, consisting of a large cylindrical vessel equipped with means to provide rapid external recycling of the reactants and the catalyst.

The temperature within reactor 10 will be dependent to a large extent, upon the concentration of catalyst and the type of hydrocarbons being charged. However, the temperature will ordinarily be within the range of about 150° to 400° F. and the pressure varied accordingly to maintain the reactants and the catalyst in liquid phase.

The time of contact between the catalyst and the hydrocarbon reactants defined as the volume of catalyst in the reaction zone, divided by the volume per minute of hydrocarbon feed to the reaction zone may be within the range of about 5 to about 80 minutes. The ratio of hydrocarbon to hydrogen fluoride in the reaction zone may vary considerably, but will ordinarily be within the range of about 0.5 to 20 parts of hydrocarbon to 1 part of hydrogen fluoride, and preferably within the range of about 1 to 10 parts of hydrocarbon to 1 part of hydrogen fluoride.

The reaction products including catalyst therein and unconverted charge are removed from reactor 10 through line 11 containing valve 12 into settler 13, wherein a catalyst layer is separated from the hydrocarbons. Light gases formed during the cracking reaction are withdrawn from settler 13 through line 14 containing valve 15 and processed in suitable recovery systems well-known to those skilled in the art. The hydrogen fluoride in the gases leaving the system at this point is recovered in a stripping zone and returned to the system.

The liquid hydrocarbons are removed from settler 15 through line 25 containing valve 26 into pump 27, which discharges through line 28 containing valve 29 into fractionator 30, wherein the gasoline hydrocarbons are separated from the unconverted charge. The gasoline hydrocarbons are withdrawn from fractionator 30 through line 31, containing valve 32 through condenser 40 and into receiver 41 wherein the gasoline hydrocarbons are separated from light gases and recovered as a product of the reaction through line 44 and valve 45. The light gases may be removed from receiver 41 through line 42 containing valve 43. The unconverted charge is withdrawn from fractionator 30 through line 33 containing valve 34 into the suction of pump 35 which discharges through line 36 containing valve 37 into line 1, thus recycling the unconverted charge to reactor 10. Reflux to column 30 is obtained through line 46 containing valve 47, pump 48 and valve 49.

In some cases, one of the products of the cracking reaction consists of high-boiling hydrocarbons which are considerably higher boiling than the original charge. It is important that these materials be prevented from being reintroduced into the reaction zone. In these cases, a fractionation system is employed consisting of at least two fractionators, the first fractionator separating the unconverted charge and gasoline hydrocarbons from a bottoms fraction comprising the high-boiling hydrocarbons formed during the cracking reaction. The subsequent fractionators are then employed to separate the gasoline hydrocarbons from the unconverted charge and the latter recycled to the reaction zone.

In the attached drawing, only one fractionator is shown. Small portions of high-boiling hydrocarbons formed during the reaction in the catalyst phase are prevented from building up by the use of a drag stream through line 38 containing valve 39, thereby removing either continuously or intermittently a portion of the high-boiling hydrocarbons formed in the reaction zone.

The catalyst layer separated in settler 13 is withdrawn through line 16 containing valve 17 into pump 18 which discharges through line 19 containing valve 20 into line 4 where it is commingled with charge stock. The fresh catalyst and make-up catalyst may be introduced into the system through line 21 containing valve 22.

As previously stated, the present invention comprises the use of a promoter to enhance the cracking ability of hydrogen fluoride when it is employed as a cracking catalyst. The promoter consists of metallic aluminum and may be employed in this system, either as stationary plates in the reaction zone or in the finely divided state suspended in the hydrocarbon charge or the liquid hydrogen fluoride phase. In the description of the present drawing, it is assumed that the promoter is employed in a finely divided state suspended in the hydrogen fluoride. This promoter is introduced into the system along with the hydrogen fluoride through line 21, containing valve 22, and is also recycled from settling zone 13 through line 16 to the reaction zone 10, along with the hydrogen fluoride recycle. A portion of the hydrogen fluoride containing some of the aluminum suspended therein may be continuously or intermittently withdrawn from settler 13 through line 23, conaining valve 24 and may be further processed to effect a purification thereof. For example, the mixture may be passed through filters to remove the aluminum and the aluminum-free hydrogen fluoride solution fractionated to produce a substantially pure hydrogen fluoride which can be recycled to the reaction zone.

Heretofore, in this specification, the catalyst has been referred to as comprising hydrogen fluoride and an amount of aluminum sufficient to promote the activity of the hydrogen fluoride. However, it is not intended to limit the broad scope of this invention to the use of hydrogen fluoride alone in conjunction with metallic aluminum, since various combinations of hydrogen fluoride and boron fluoride, hydrogen fluoride and acid metal fluoride, such as potassium acid fluoride and sodium acid fluoride and similar metallic fluorides may be employed as catalysts in the process. Therefore, reference to a catalyst comprising hydrogen fluoride in this specification and appended claims is intended to include the previously referred to combinations.

The following examples illustrate in a general way the improvements realized when practicing the process of the present invention. However, it is not intended that these specific examples limit the general broad scope of this invention to the exact conditions shown in the examples.

*Examples*

Charge Stock _____ Penn gas oil, 900 cc.
Reactor _____ 3-liter rotating bomb
Temperature _____ 175° C.

| Example No. | 1 | 2 |
|---|---|---|
| Wt. of HF Charged, g. | 775 | 782 |
| Wt. of Aluminum Powder, g. | 0 | 45 |
| Time at Temperature, Hours | 6 | 6 |
| Yields, Wt. Per Cent Gas Oil Charged: | | |
| n—C$_5$— | 21.6 | 16.2 |
| C$_6$—400° F. | 14.6 | 20.1 |
| 400° F+ | 39.2 | 50.3 |
| Hydrocarbons in Catalyst Layer | 21.0 | 11.4 |
| Loss | 3.6 | 2.0 |
| Br. No. of C$_6$—400° F. Fraction | <1 | <1 |
| ASTM Octane No. Clear | 64 | 67 |

It will be noted that the gasoline yield in Example 2, wherein aluminum is used along with HF as a catalyst gives an increase of about 37.6% of gasoline. It should be also noted that the quality of the product is better, the octane number being 67 as compared with 64.

I claim as my invention:

1. A catalytic cracking process which comprises subjecting a high boiling hydrocarbon to the action of a catalyst comprising hydrogen fluoride and aluminum at a temperature within the range of about 150° to 400° F. and under a pressure sufficient to maintain the hydrogen fluoride and hydrocarbons substantially in the liquid phase.

2. A catalytic cracking process which comprises contacting a hydrocarbon charge with a catalyst comprising hydrogen fluoride and aluminum at a cracking temperature and under sufficient pressure to maintain the hydrogen fluoride and hydrocarbons in substantially the liquid phase.

3. The process of claim 2 further characterized in that said aluminum is in powdered form.

4. The process of claim 2 further characterized in that said hydrocarbon charge comprises a gas oil.

WARREN W. JOHNSTONE.

REFERENCES CITED

The following references are of record in the file of this patent:

UNITED STATES PATENTS

| Number | Name | Date |
|---|---|---|
| 1,854,146 | Galle et al. | Apr. 12, 1932 |
| 2,122,903 | Winkler | July 5, 1938 |
| 2,354,565 | Wood et al. | July 25, 1944 |

FOREIGN PATENTS

| Number | Country | Date |
|---|---|---|
| 411,228 | Germany | Mar. 28, 1925 |